US012379576B2

(12) United States Patent
Schultz et al.

(10) Patent No.: US 12,379,576 B2
(45) Date of Patent: Aug. 5, 2025

(54) ANAMORPHIC LENS ASSEMBLIES

(71) Applicant: Atlas Lens Co., Glendale, CA (US)

(72) Inventors: Forrest Tanner Schultz, Sun Valley, CA (US); Duane Scott Dewald, McKinney, TX (US)

(73) Assignee: Atlas Lens Co., Glendale, CA (US)

( * ) Notice: Subject to any disclaimer, the term of this patent is extended or adjusted under 35 U.S.C. 154(b) by 423 days.

(21) Appl. No.: 17/899,448

(22) Filed: Aug. 30, 2022

(65) Prior Publication Data

US 2024/0053589 A1 Feb. 15, 2024

Related U.S. Application Data

(60) Provisional application No. 63/396,566, filed on Aug. 9, 2022.

(51) Int. Cl.
| | |
|---|---|
| *G02B 13/08* | (2006.01) |
| *G02B 9/04* | (2006.01) |
| *G02B 13/18* | (2006.01) |

(52) U.S. Cl.
CPC .............. *G02B 13/08* (2013.01); *G02B 9/04* (2013.01); *G02B 13/18* (2013.01)

(58) Field of Classification Search
CPC .......... G02B 13/08; G02B 9/04; G02B 13/18; G02B 13/06; G02B 3/06; G02B 13/12; G02B 7/04; G02B 27/0966; G02B 13/02; G02B 13/22; G02B 27/0037; H04N 5/76; H04N 23/698; H04N 23/51; H04N 23/54; H04N 23/55; H04N 5/2252; H04N 5/2253; H04N 5/2254

USPC .................................................. 359/668, 671
See application file for complete search history.

(56) References Cited

U.S. PATENT DOCUMENTS

| | | | |
|---|---|---|---|
| 2,048,284 | A | 7/1936 | Newcomer |
| 2,890,622 | A | 6/1959 | Wallin |
| 2,940,372 | A | 6/1960 | Ehrenhaft et al. |
| 3,410,630 | A | 11/1968 | Jacobs |

(Continued)

OTHER PUBLICATIONS

International Search Report and Written Opinion, PCT App. No. PCT/US23/29659, Nov. 27, 2023, 9 pages.

*Primary Examiner* — Thomas K Pham
*Assistant Examiner* — Kuei-Jen L Edenfield
(74) *Attorney, Agent, or Firm* — Nicholson De Vos Webster & Elliott LLP

(57) ABSTRACT

Lens assemblies according to the disclosure include an anamorphic lens component and a primary lens component. The anamorphic lens component includes a first cylindrical lens element, a second cylindrical lens element, and a first spherical lens element disposed between the first and second cylindrical lens elements and translatable along an optical axis of the anamorphic lens assembly with respect to the first and second cylindrical lens elements. Optical characteristics of the anamorphic lens component are adjustable as the first spherical lens element translates along the optical axis such that the first cylindrical lens element, the first spherical lens element, and the second cylindrical lens element in combination produce a first astigmatism that is opposite to a second astigmatism produced in an image plane by the primary lens component as an object moves from infinity focus toward the lens assembly.

20 Claims, 9 Drawing Sheets

(56) References Cited

U.S. PATENT DOCUMENTS

| | | | | |
|---|---|---|---|---|
| 3,682,533 | A * | 8/1972 | Vetter | G02B 13/08 |
| | | | | 359/671 |
| 3,871,748 | A * | 3/1975 | Day | G02B 13/08 |
| | | | | 359/710 |
| 7,654,678 | B1 | 2/2010 | Runco et al. | |
| 10,942,357 | B2 | 3/2021 | Suhara | |
| 10,969,568 | B1 * | 4/2021 | Li | G02B 13/08 |
| 2005/0225876 | A1 | 10/2005 | Nurishi | |
| 2006/0050403 | A1 * | 3/2006 | Neil | G02B 13/08 |
| | | | | 359/671 |
| 2007/0081257 | A1 * | 4/2007 | Bowron | G02B 13/08 |
| | | | | 359/668 |
| 2010/0208149 | A1 | 8/2010 | Morikuni | |
| 2016/0170173 | A1 * | 6/2016 | Macintosh | G03B 17/565 |
| | | | | 359/668 |
| 2016/0170186 | A1 | 6/2016 | Neil | |
| 2017/0212334 | A1 | 7/2017 | Imaoka | |
| 2018/0284401 | A1 | 10/2018 | Noethen | |
| 2019/0094488 | A1 | 3/2019 | Macintosh et al. | |
| 2020/0264412 | A1 | 8/2020 | Neil | |

\* cited by examiner

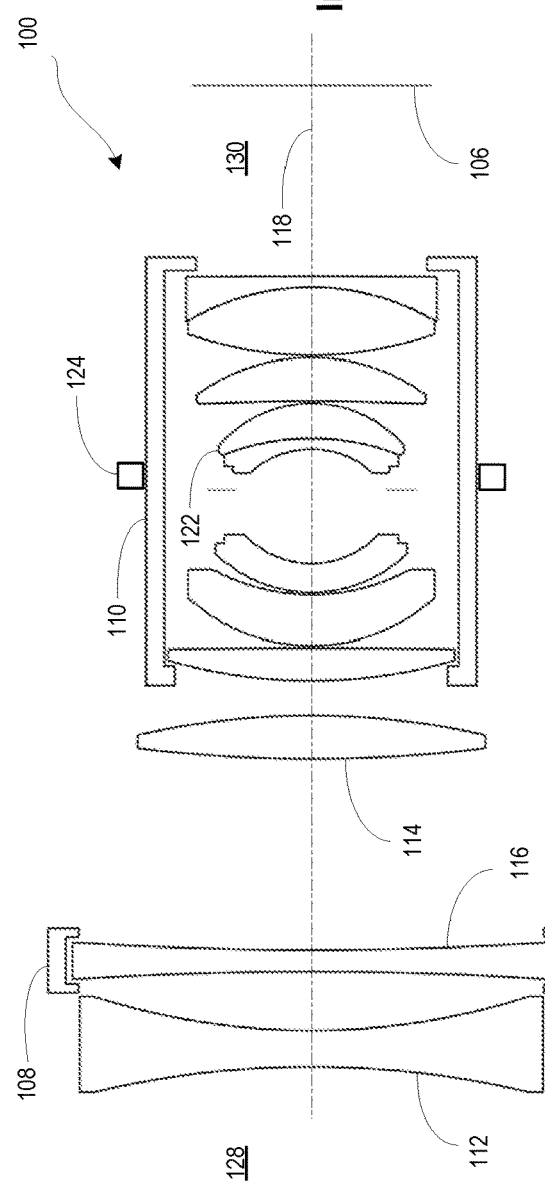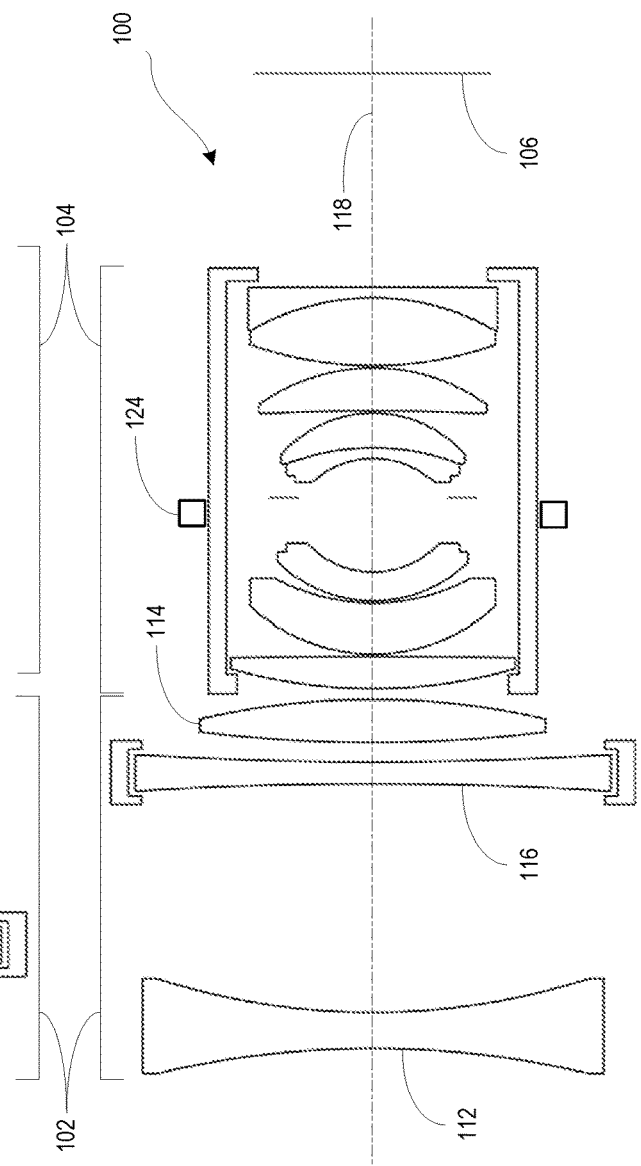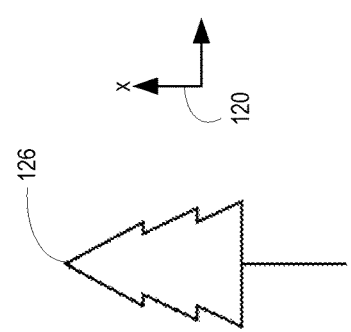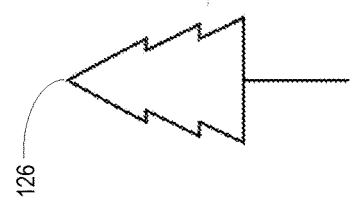

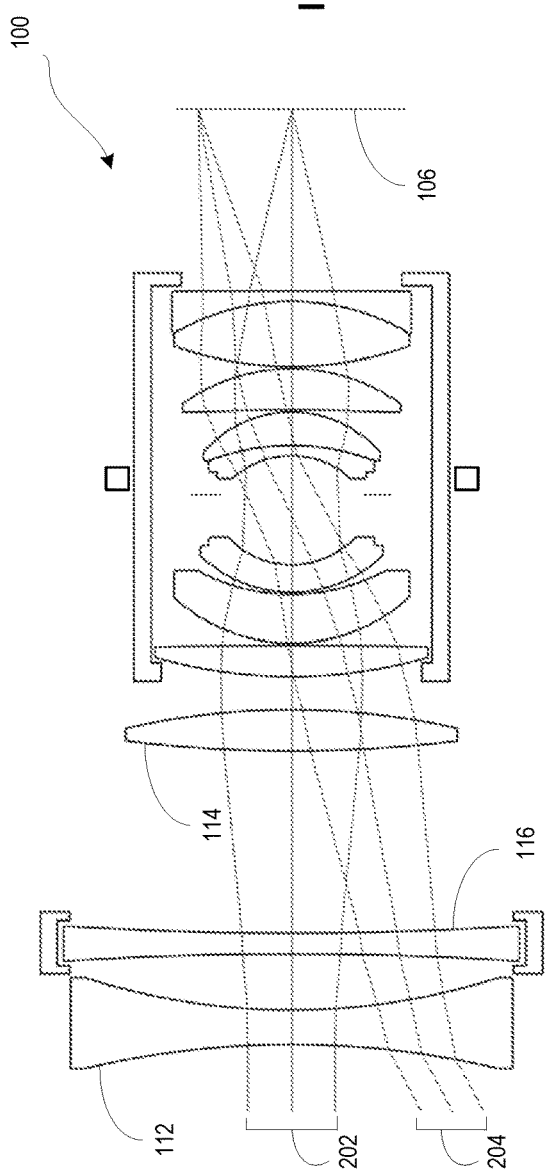
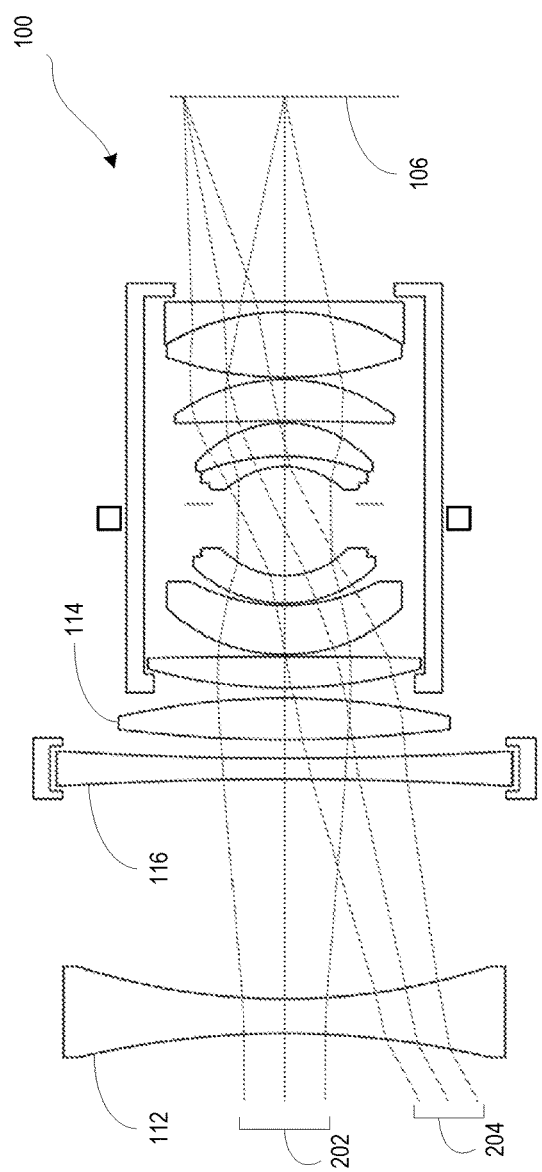

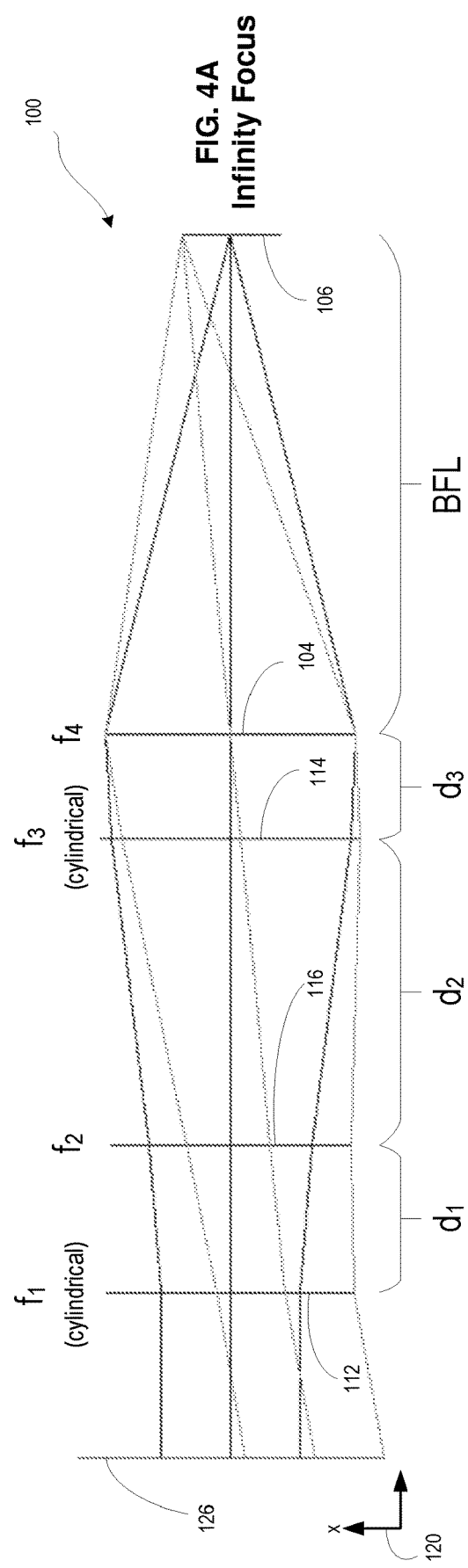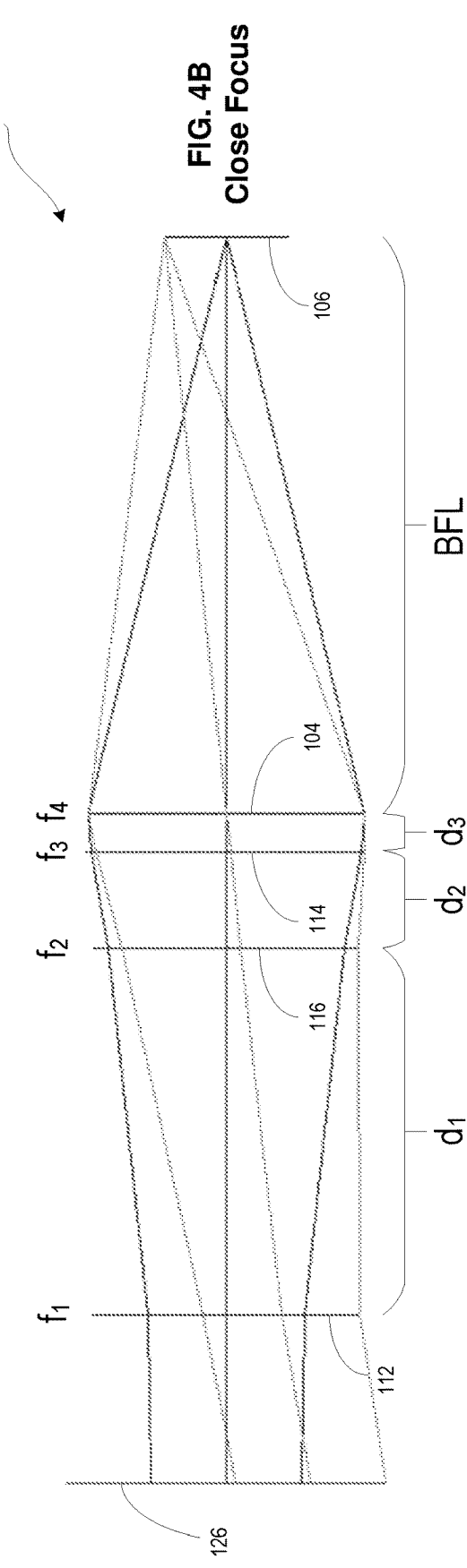

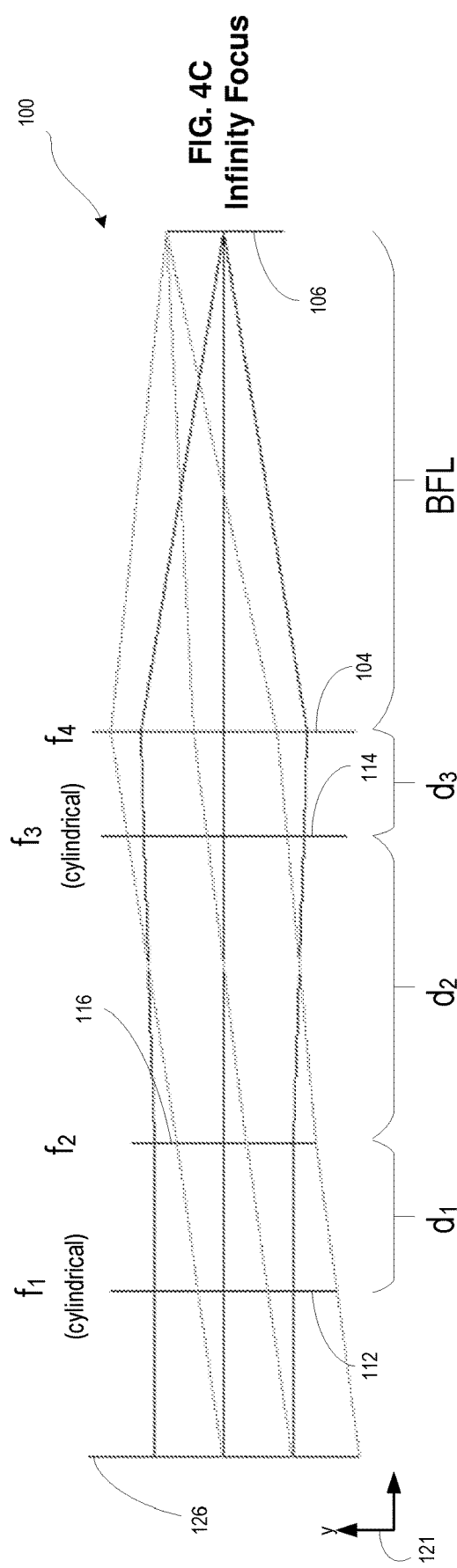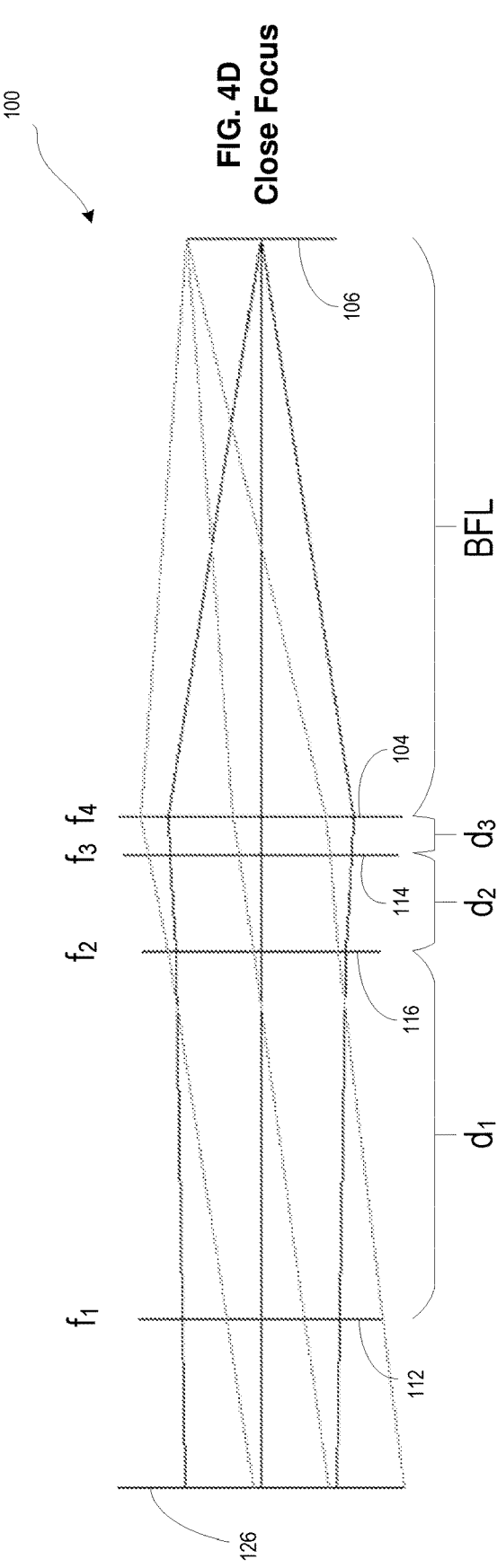

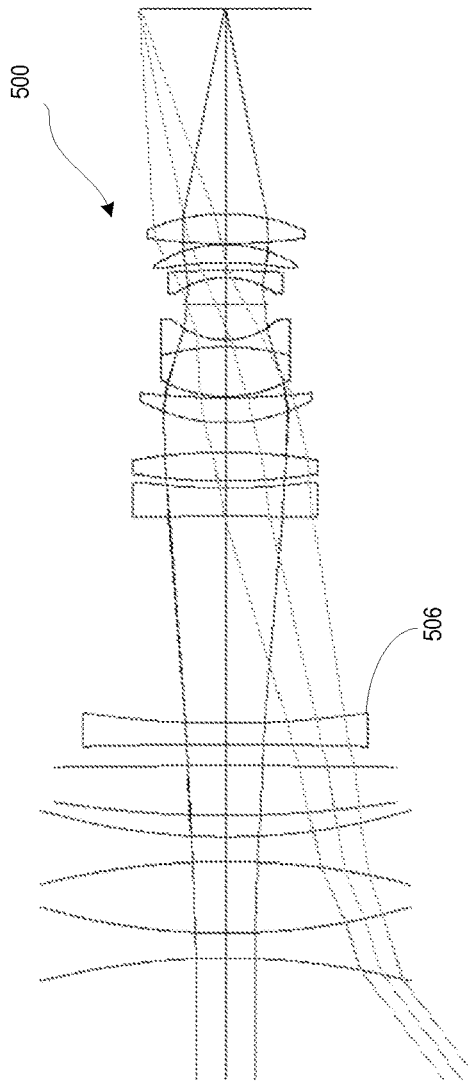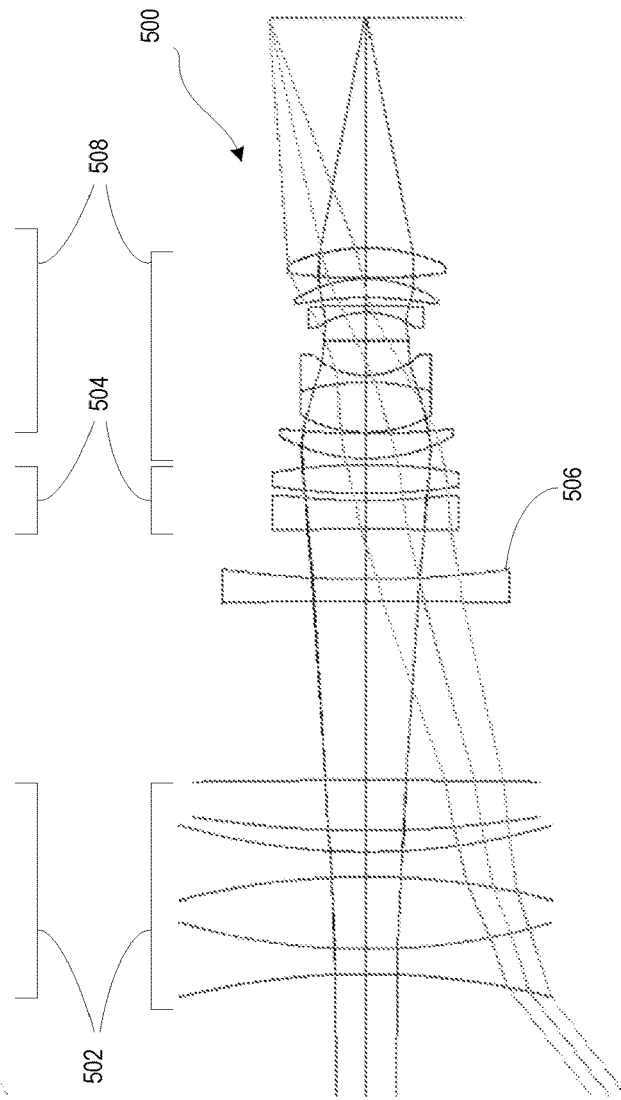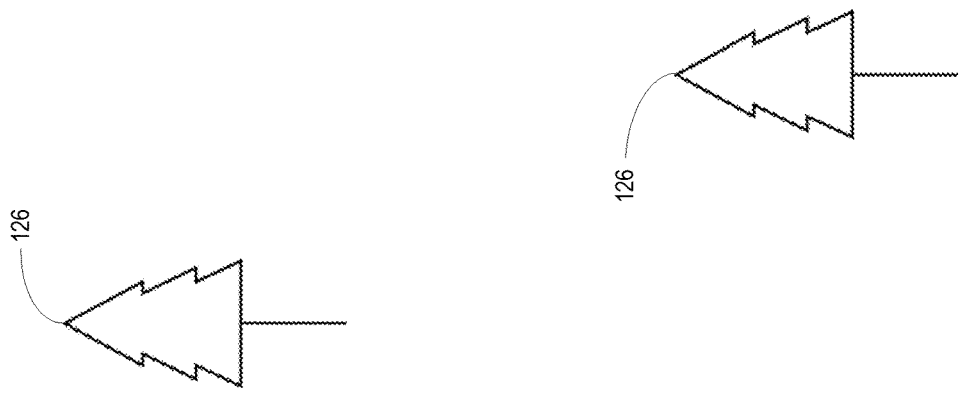

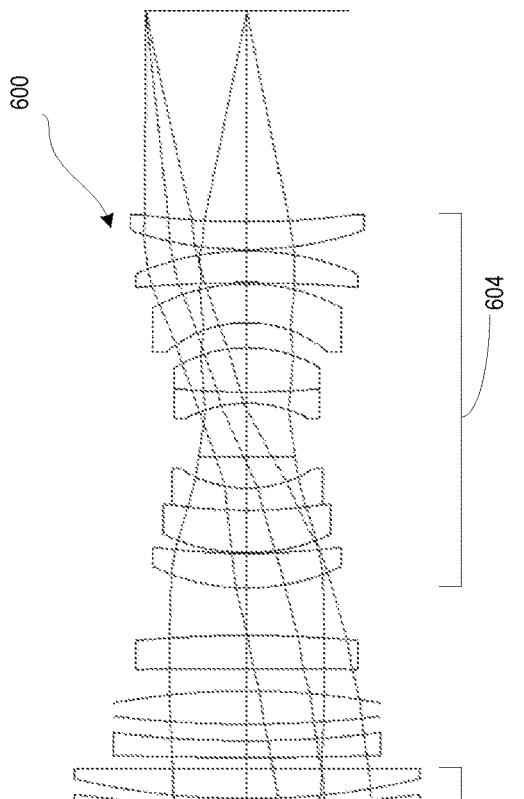
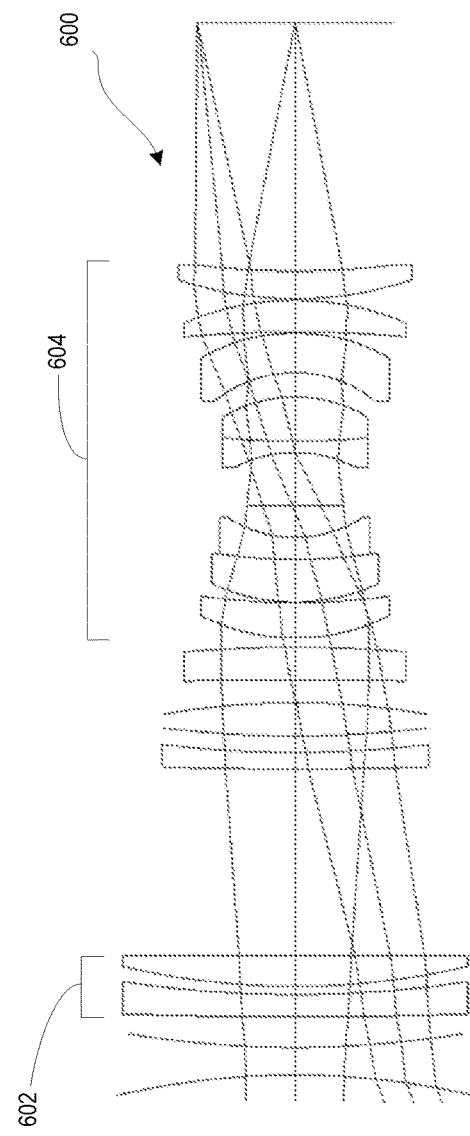
FIG. 6A Infinity Focus
FIG. 6B Close Focus

Infinity Focus

Close Focus

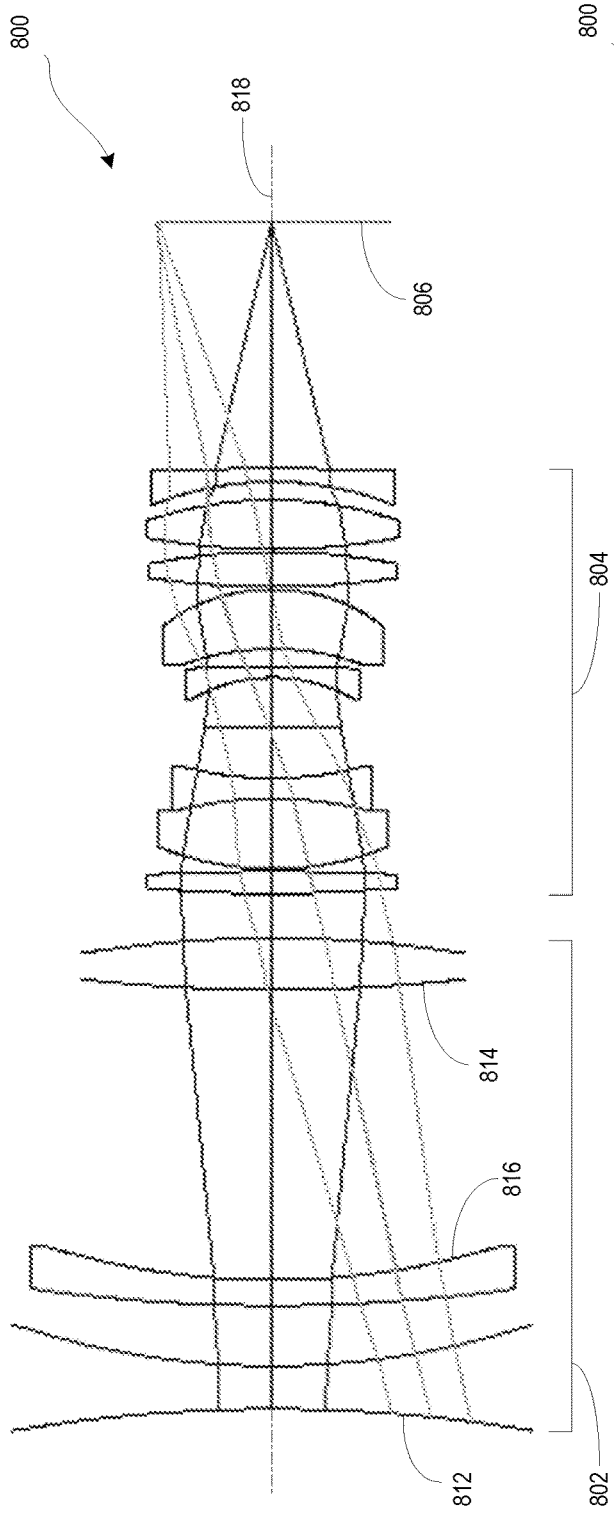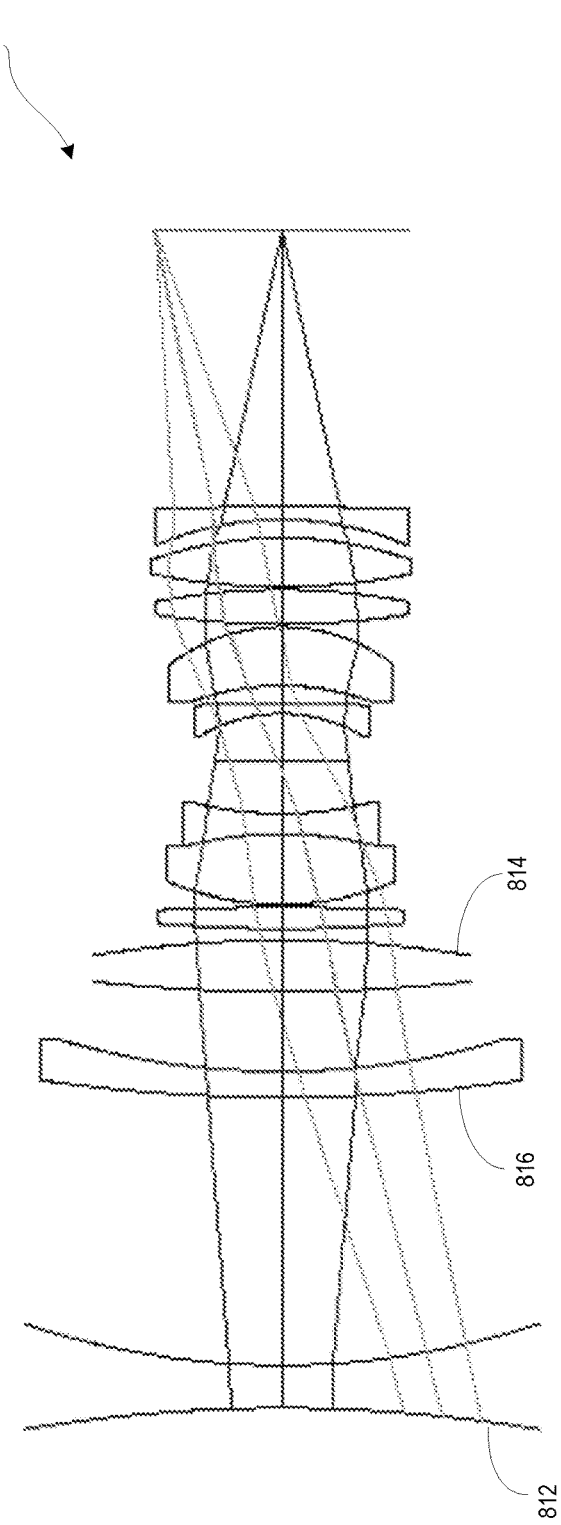

ANAMORPHIC LENS ASSEMBLIES

CROSS-REFERENCE TO RELATED APPLICATION

This application claims priority to U.S. Provisional Application Ser. No. 63/396,566, filed on Aug. 9, 2022. The entire contents of the priority application are hereby incorporated by reference herein as if fully set forth.

BACKGROUND

Anamorphic format is the cinematography technique of shooting a widescreen picture on standard 35 mm film or other visual recording media with a non-widescreen native aspect ratio. It also refers to the projection format in which a distorted image is stretched by an anamorphic projection lens to recreate the original aspect ratio on a viewing screen. An anamorphic lens typically includes a spherical primary lens, plus an anamorphic attachment (or an integrated lens element) that does the anamorphosing. The anamorphic element operates at infinite focal length, so that it has little or no effect on the focus of the primary lens it's mounted on, but still anamorphoses (distorts) the optical field. The distortion introduced in the camera must be corrected when the film is projected, so another lens is used in the projection booth that restores the picture back to its correct proportions to restore normal geometry. The picture is not manipulated in any way in the dimension that is perpendicular to the dimension that is anamorphosed.

Typically, an anamorphic lens captures (or projects) a wider horizontal angle of view than is normally possible with a spherical lens, in order to create a widescreen presentation. The anamorphic lens does this through optically distorting the image in the horizontal direction upon capture, and this distortion is then reversed in presentation. This method of widescreen image capture enables up to twice the width of the imager to be captured by distorting the image prior to recording, and then undistorting that compressed image later, either during post-production or during exhibition.

A traditional anamorphic lens optically compresses a wider angle of view onto a standard imager size by distorting the image's proportions, compressing the image horizontally. An alternative approach that achieves much the same result is to expand the image vertically. Either way, this horizontally squeezed (or vertically stretched) image is then undistorted into a widescreen aspect ratio through a corresponding anamorphic lens on a projector, or through digital correction of the distorted image.

An anamorphic lens assembly typically includes a spherical primary lens, plus an anamorphic attachment called an anamorphot (often an integrated multiple cylindrical-lens assembly) that does the squeezing (anamorphosing). The power of this attachment is typically zero in the vertical axis, such that it acts just like a piece of flat glass, and 0.5× in the horizontal axis, which reduces the effective focal length of the spherical lens by half in the horizontal direction. Most anamorphic systems work with this 0.5× compression (squeezing) power for gathering the image, which results in a 2× widening when presenting the image unsqueezed, although there are other compression ratios available, as well as the aforementioned vertical expansion approach. What this all means, generally, is that a 50 mm anamorphic lens will have the vertical angle of view of a 50 mm spherical lens, but the equivalent horizontal angle of view of a 25 mm spherical lens.

BRIEF DESCRIPTION OF DRAWINGS

Various embodiments in accordance with the present disclosure will be described with reference to the drawings, in which:

FIGS. 1A and 1B are schematic diagrams illustrating an anamorphic lens assembly according to some embodiments;

FIGS. 2A and 2B are schematic diagrams illustrating convergence of light rays through the anamorphic lens assembly of FIGS. 1A and 1B, respectively;

FIGS. 4A and 4B are schematic diagrams illustrating a general treatment of the anamorphic lens assembly of FIGS. 1A and 1B using paraxial optics, and viewed along the y-axis;

FIGS. 4C and 4D are schematic diagrams illustrating a general treatment of the anamorphic lens assembly of FIGS. 1A and 1B using paraxial optics, and viewed along the x-axis such that the cylindrical lenses have no optical power;

FIGS. 5A and 5B are schematic diagrams illustrating another anamorphic lens assembly according to some embodiments;

FIGS. 6A and 6B are schematic diagrams illustrating another anamorphic lens assembly according to some embodiments;

FIGS. 8A and 8B are schematic diagrams illustrating another anamorphic lens assembly according to some embodiments.

DETAILED DESCRIPTION

Figure 3:
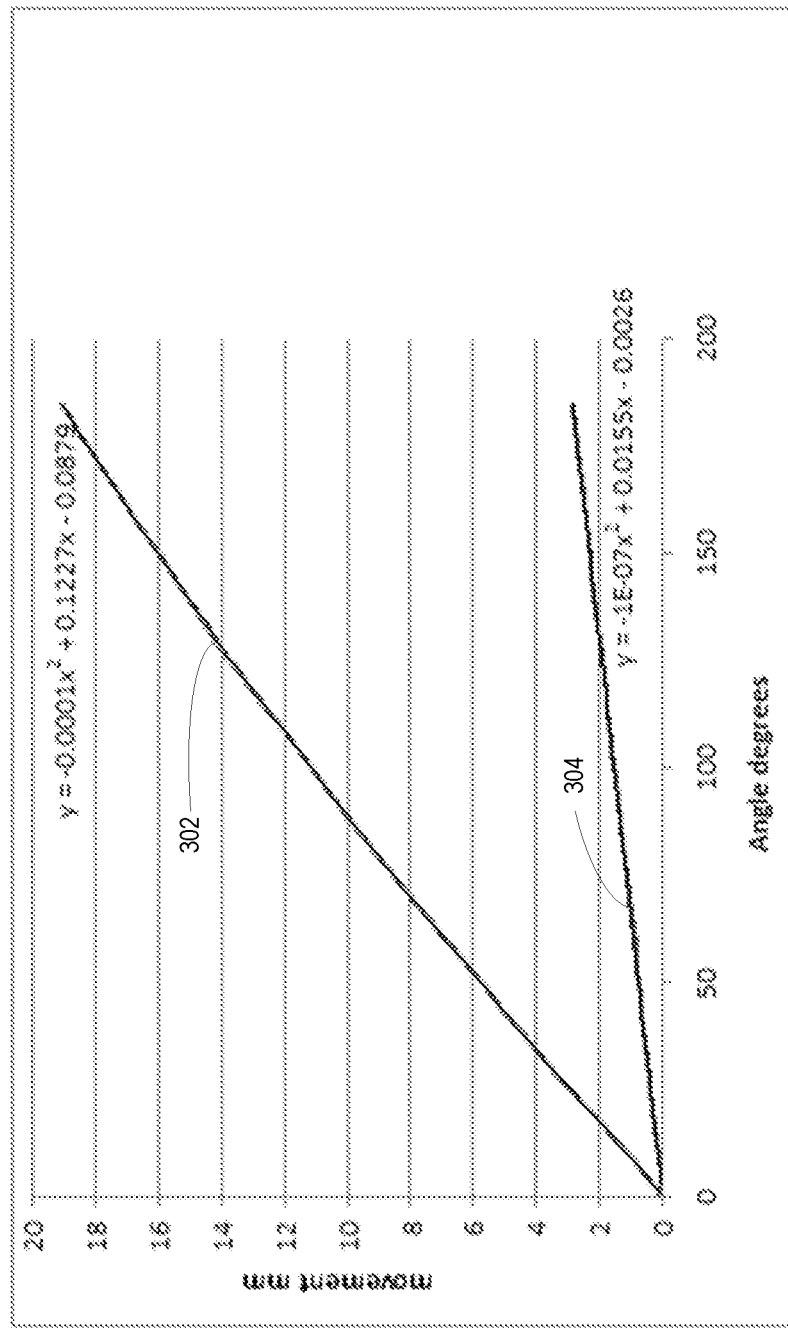
FIG. 3 is a graph illustrating two example polynomial relationships between a rotational angle of a focus ring and a position of a first spherical lens element in anamorphic lens assemblies according to some embodiments.

The present disclosure relates to anamorphic lens assemblies. Traditionally, anamorphic lenses have different focal lengths along the horizontal and vertical axes because of the cylindrical lenses that perform the anamorphosing. These different focal lengths in perpendicular directions creates astigmatism. A lens with astigmatism is one in which light rays that propagate through the lens in two perpendicular planes have different foci (points where the light rays converge). For example, if a lens with astigmatism is used to form an image of a cross, the vertical and horizontal lines of the cross will be in sharp focus at two different distances.

Previous solutions to the astigmatism problem in anamorphic lenses have several drawbacks. For example, previous solutions have focused on adding cylindrical lenses to correct astigmatism, resulting in lens assemblies that are bulky, complicated, and expensive. These solutions have also created undesirable artifacts, such as the anamorphic mumps effect at close focus (e.g., at less than 10 feet from the object). For reasons of practical optics, the anamorphic squeeze is not uniform across the image field in traditional anamorphic systems (whether cylindrical, prismatic, or mirror-based). This variation results in some areas of the film image appearing more stretched than others. In the case of an actor's face, when positioned in the center of the screen, the face looks somewhat like the actor has the mumps, hence the name for the phenomenon.

Some of the present embodiments solve the above-described problems by providing an anamorphic lens assembly having first and second cylindrical lens elements and a spherical lens element that is translatable along the optical axis of the anamorphic lens assembly between the first and second cylindrical lens elements. These embodiments use the movable spherical lens element to correct the astigmatism problem described above. These embodiments have a less complex structure as compared to previous anamorphic lens assemblies, which advantageously reduces the cost of producing anamorphic lens assemblies according to the present embodiments, as well as reducing their bulk. And, while previous solutions have tried to keep the anamorphic ratio constant as the distance between the camera and the object changed, some of the present embodiments allow the anamorphic ratio to change within a small range, such as less than 2% in some examples. This change of such small magnitude is imperceptible to the human eye, so that embodiments in which the change in the anamorphic ratio is below the threshold of 2% still advantageously produce no noticeable change to the anamorphic ratio as the distance between the camera and the object changes. In alternative embodiments, the anamorphic ratio may change within a somewhat larger range, such as less than 5%, or less than 4%, or less than 3%, in some examples. In some embodiments, the anamorphic ratio change with focus can be adjusted to match the characteristics of a given anamorphic lens as desired.

FIGS. 1A and 1B illustrate an anamorphic lens assembly 100 according to some embodiments. The anamorphic lens assembly 100 includes an anamorphic lens component 102 and a primary lens component 104. In some embodiments, the anamorphic lens component 102 and the primary lens component 104 may be configured as a module that is attachable to, and removable from, other components of a camera system that includes an image plane 106. In other embodiments, the anamorphic lens component 102 and the primary lens component 104 may be configured as separate modules that are attachable to, and removable from, one another, as well as attachable to, and removable from, other components of the camera system.

With reference to FIG. 1A, the anamorphic lens component 102 may include a first housing 108 that forms the exterior of the anamorphic lens component 102. Similarly, the primary lens component 104 may include a second housing 110 that forms the exterior of the primary lens component 104. In some embodiments, the first and second housings 108, 110 may be sections of an overall housing for the anamorphic lens assembly 100. In the illustrated embodiment, only a portion of the first housing 108 is shown, and it should be understood that the first housing 108 at least partially surrounds and retains all lens elements of the anamorphic lens component 102.

In FIG. 1A the anamorphic lens assembly 100 is shown in an infinity focus arrangement, while in FIG. 1B the anamorphic lens assembly 100 is shown in a close focus arrangement. With reference to FIG. 1A, the anamorphic lens component 102 includes a first cylindrical lens element 112, a second cylindrical lens element 114, and a first spherical lens element 116 disposed between the first and second cylindrical lens elements 112, 114. Relative positions of the first and second cylindrical lens elements 112, 114 are fixed along an optical axis 118 of the anamorphic lens assembly 100, while the first spherical lens element 116 is translatable along the optical axis 118 with respect to the first and second cylindrical lens elements 112, 114. In some embodiments, the fixed distance between the first and second cylindrical lens elements 112, 114, coupled with the ability of the first spherical lens element 116 to translate along the optical axis 118 between the first and second cylindrical lens elements 112, 114, advantageously allows the spacings between the first spherical lens element 116 and the first and second cylindrical lens elements 112, 114, respectively, to be adjustable. This feature contributes to the advantageous optical characteristics of some of the present embodiments, as further described below.

In some embodiments, the first cylindrical lens element 112 has a first radius of curvature along a first axis, and the second cylindrical lens element 114 has a second radius of curvature along the first axis, where the first axis is perpendicular to the optical axis 118. For example, in some embodiments the first and second cylindrical lens elements 112, 114 have arcuate shapes including a concave portion or a convex portion on at least one side such that in the horizontal direction (e.g., along the x-axis 120) one or both of the first and second cylindrical lens elements 112, 114 increases or decreases the beam diameter by a refractive power provided by the arcuate shape(s) of the concave portion(s) or the convex portion(s), while in the vertical direction (e.g., along the y-axis) neither of the first and second cylindrical lens elements 112, 114 has refractive power, or has negligible refractive power, or the first and second cylindrical lens elements 112, 114 have equal and opposite refractive powers such that their combined refractive power is zero. In the illustrated embodiment, the first cylindrical lens element 112 has a negative power in the horizontal direction and the second cylindrical lens element 114 has a positive power in the horizontal direction. In alternative embodiments, however, the first and second cylindrical lens elements 112, 114 may have any combination of powers, including negative, positive, and/or zero.

In some embodiments, the combined power of the first spherical lens element 116 and the first and second cylindrical lens elements 112, 114 (the lenses of the anamorphic lens component 102) is zero in the vertical direction and 0.5× in the horizontal direction. In other embodiments, however, the power of the anamorphic lens component 102 in the horizontal direction may be any other value, such as 0.75×, or 0.56×, or 0.33×, or 0.25×, or any other value. In still further embodiments, the power of the anamorphic lens component 102 is zero in the horizontal direction and 2× in the vertical direction (or 1.5×, or 1.8×, or 3×, or 4×, or any other value). The power of the anamorphic lens component 102 provides a desired amount of squeezing or stretching (anamorphosing) along a desired axis to achieve the specified anamorphic format.

In the embodiment illustrated in FIGS. 1A and 1B, each of the first spherical lens element 116, the first cylindrical lens element 112, and the second cylindrical lens element 114 is represented as a single lens (singlet). This embodiment is, however, merely one example. In alternative embodiments, any of the lens elements 112, 114, 116 may comprise multiple lenses (e.g., a lens group), such as pairs of lenses (doublets). For example, in some embodiments, the first spherical lens element 116 may comprise a singlet while the first and second cylindrical lens elements 112, 114 may comprise doublets. In another example, in some embodiments, the first spherical lens element 116 may comprise a doublet while the first and second cylindrical lens elements 112, 114 may comprise singlets.

With reference to FIG. 1A, the primary lens component 104 is disposed on a side of the second cylindrical lens element 114 opposite the first spherical lens element 116, and includes one or more second spherical lens elements 122. The second spherical lens elements 122 may be configured to provide primary imaging by, for example, varying a focus of an image formed by the primary lens component 104. The one or more second spherical lens elements 122 may therefore be translatable along the optical axis 118 with respect to the first and second cylindrical lens elements 112, 114, as further described below. In some embodiments, the second spherical lens elements 122 may be configured to vary other optical properties of the image, such as a softness of the image, a size of the image, or may be configured to correct for blur or aberrations in the image, or to change other optical properties as desired. While the second spherical lens elements 122 are described herein as being spherical, in some embodiments one or more of the second spherical lens elements 122 may be aspherical if desired.

With reference to FIG. 1A, and as described above, the relative positions of the first and second cylindrical lens elements 112, 114 are fixed along the optical axis 118 of the anamorphic lens component 102. The first spherical lens element 116 is, however, translatable along the optical axis 118 with respect to the first and second cylindrical lens elements 112, 114. For example, FIG. 1A illustrates the anamorphic lens assembly 100 in an infinity focus arrangement in which the first spherical lens element 116 is disposed at the limit of its travel in the direction of the first cylindrical lens element 112, while FIG. 1B illustrates the anamorphic lens assembly 100 in a close focus arrangement in which the first spherical lens element 116 is disposed at the limit of its travel in the direction of the second cylindrical lens element 114.

In some embodiments, movement of the first spherical lens element 116 may be controlled by a focus adjustment member 124 (e.g., a focus ring) disposed around the primary lens component 104. In embodiments in which the focus adjustment member 124 is a focus ring, the focus ring 124 may be rotatable about the primary lens component 104. The focus ring 124 may be mechanically coupled to one or more additional focus adjustment members (not shown), which may be mechanically coupled to the first spherical lens element 116, such that rotation of the focus ring 124 adjusts the focus of the primary lens component 104 while simultaneously inducing translation of the first spherical lens element 116 along the optical axis 118 between the first and second cylindrical lens elements 112, 114. Together, the focus adjustment member 124 and the one or more additional focus adjustment members that mechanically couple the focus adjustment member 124 to the first spherical lens element 116 may comprise a translation mechanism of the first spherical lens element 116. Thus, for example, as the focus ring 124 is rotated in a first rotational direction around the primary lens component 104, the primary lens component 104 may be adjusted away from the infinity focus arrangement (FIG. 1A) and toward the close focus arrangement (FIG. 1B) while the first spherical lens element 116 travels away from the first cylindrical lens element 112 and toward the second cylindrical lens element 114. Conversely, as the focus ring 124 is rotated in a second rotational direction around the primary lens component 104, the primary lens component 104 may be adjusted away from the close focus arrangement (FIG. 1B) and toward the infinity focus arrangement (FIG. 1A) while the first spherical lens element 116 travels away from the second cylindrical lens element 114 and toward the first cylindrical lens element 112. In some embodiments, focus of the primary lens component 104 may be controlled by a threaded focus adjustment mechanism, or controlled by a cam mechanism. For example, as described below, in some embodiments relative movements of the first spherical lens element 116 and the primary lens component 104 may be nonlinear. In such embodiments, one of the first spherical lens element 116 or the primary lens component 104 may move linearly with a thread, while the other may move via a cam mechanism.

With reference to FIG. 1A, the anamorphic lens assembly 100 according to some embodiments is configured to produce a focused image of an object 126 (on an object side 128 of the anamorphic lens assembly 100) at the image plane 106 of a camera (on an image side 130 of the anamorphic lens assembly 100). In some embodiments, the camera may be a digital camera, and the image plane 106 may comprise an image sensor having an imaging area for receiving images from the anamorphic lens assembly 100. In other embodiments, the camera may be a film camera, and the image plane 106 may comprise film having an imaging area for receiving, on film, images from the anamorphic lens assembly 100. In some embodiments, the anamorphic lens assembly 100 may be configured as a module that is attachable to, and removable from, the camera, while in other embodiments the anamorphic lens assembly 100 may be integrated within the camera. In some embodiments, the camera may be a cinema camera configured to generate images for presentation by a cinema projector. In some embodiments, the primary lens component 104 may have an internal focus mechanism (not shown) that enables one or more lenses within the primary lens component 104 to move in order to achieve focus.

In some embodiments, as the first spherical lens element 116 travels along the optical axis 118 relative to the first and second cylindrical lens elements 112, 114, a spacing between the second cylindrical lens element 114 and the primary lens component 104 changes. For example, with reference to both FIGS. 1A and 1B, as the first spherical lens element 116 travels away from the infinity focus arrangement of FIG. 1A (away from the first cylindrical lens element 112) and toward the close focus arrangement of FIG. 1B (toward the second cylindrical lens element 114), a spacing between the second cylindrical lens element 114 and the primary lens component 104 decreases. This relative movement of the first spherical lens element 116 and the primary lens component 104 maintains focus of the image at the image plane 106, and in some embodiments the image plane 106 may move relative to the primary lens component 104 as the anamorphic lens assembly 100 transitions between the infinity focus arrangement and the close focus arrangement. In alternative embodiments, such as where the first spherical lens element 116 has positive refractive power, the relative directions of movement of the second cylindrical lens element 114 and the primary lens component 104 may be reversed, such that as the first spherical lens element 116 travels away from the infinity focus arrangement and toward the close focus arrangement, a spacing between the second cylindrical lens element 114 and the primary lens component 104 increases.

In some embodiments, relative movements of the first spherical lens element 116 and the focus ring 124, and relative movements of the primary lens component 104 and the focus ring 124, may be defined by polynomial relationships. For example, with reference to FIG. 3, two example polynomial relationships are plotted with the x-axis representing the rotational angle of the focus ring 124 and the y-axis representing the positions of the first spherical lens element 116 and the primary lens component 104 along the optical axis 118. In some embodiments, the positions of the first spherical lens element 116 and the primary lens component 104 along the optical axis 118 may be measured with reference to respective origin points at the respective limits of travel for each of the first spherical lens element 116 and the primary lens component 104 corresponding to the infinity focus arrangement of FIG. 1A. Thus, as the focus ring 124 is rotated in the first rotational direction around the primary lens component 104, the rotational angle of the focus ring 124 increases (positive movement along the x-axis) while the first spherical lens element 116 and the primary lens component 104 both move along the optical axis 118 away from the infinity focus arrangement (FIG. 1A, origin point) and toward the close focus arrangement (FIG. 1B, terminal point). A first one 302 of the example polynomial relationships is $y=-0.0001x^2+0.1227x-0.0879$, and represents the relative movements of the focus ring 124 and the first spherical lens element 116, while a second one 304 of the example polynomial relationships is $y=-0.0000001x^2+0.0155x-0.0026$, and represents the relative movements of the focus ring 124 and the primary lens component 104. It will be appreciated, however, that these equations are only examples and are in no way limiting. In some embodiments, the movements of the first spherical lens element 116 and the primary lens component 104 are related such that the combination of all of the optical elements maintains a constant (or nearly constant) anamorphic ratio and focus along the x-axis and the y-axis.

With reference to both FIGS. 1A and 1B, as the object 126 moves from a first position (FIG. 1A) toward the anamorphic lens assembly 100, astigmatism is created by the primary lens component 104 due to different focal lengths along the horizontal and vertical axes. Therefore, refocusing only the primary lens component 104 will not achieve good focus at the image plane 106. In some embodiments, the ability of the first spherical lens element 116 to translate along the optical axis 118 relative to the cylindrical lens elements 112, 114 and the primary lens component 104 creates an opposite astigmatism to that created by the movement of the object 126 relative to the primary lens component 104, enabling the anamorphic lens assembly 100 to achieve good focus at the image plane 106, regardless of the distance of the object 126 to the lens assembly 100.

In some embodiments, optical characteristics of the first cylindrical lens element 112, the first spherical lens element 116, and the second cylindrical lens element 114 in combination produce zero astigmatism at the image plane 106 for the object 126 at infinity focus. For example, as shown in FIG. 2A, when the object 126 is at infinity focus and the anamorphic lens assembly 100 is in the infinity focus arrangement, on-axis light rays 202 converge at the image plane 106 while off-axis light rays 204 similarly converge at the image plane 106. In some embodiments, the optical characteristics of the first cylindrical lens element 112, the first spherical lens element 116, and the second cylindrical lens element 114 in combination are adjustable as the first spherical lens element 116 translates along the optical axis 118 with respect to the first and second cylindrical lens elements 112, 114, such that the first cylindrical lens element 112, the first spherical lens element 116, and the second cylindrical lens element 114 in combination produce a first astigmatism that is opposite to a second astigmatism produced in the image plane 106 by the one or more second spherical lens elements 122 as the object 126 moves from a first position at the infinity focus toward the anamorphic lens assembly 100. For example, as shown in FIG. 2B, when the object 126 is at close range and the anamorphic lens assembly 100 is in the close focus arrangement, on-axis light rays 202 converge at the image plane 106 while off-axis light rays 204 similarly converge at the image plane 106.

In some embodiments, a spherical aberration of the first spherical lens element 116 is corrected to match optical characteristics of the entire anamorphic lens assembly 100. In some embodiments, because the first spherical lens element 116 is movable with respect to the first and second cylindrical lens elements 112, 114 and the primary lens component 104, its spherical aberration cannot be perfectly corrected for every position of the first spherical lens element 116 along the optical axis 118. Thus, there may be no ideal shape for the first spherical lens element 116. Rather, its shape is selected to balance other aberrations from the first and second cylindrical lens elements 112, 114 and the primary lens component 104 based on the optical characteristics of those lenses.

With reference to both FIGS. 1A and 1B, as the anamorphic lens assembly 100 transitions between the infinity focus arrangement (FIG. 1A) and the close focus arrangement (FIG. 1B), the horizontal and vertical focal lengths of the combination of the first cylindrical lens element 112, the first spherical lens element 116, and the second cylindrical lens element 114 change due to the changes in the spacings between these lens elements. The changing focal lengths cause the anamorphic ratio of the anamorphic lens component 102 to also change slightly. In some embodiments the difference in the anamorphic ratio is less than 2% (or less than 5%, or less than 4%, or less than 3%) between the infinity focus arrangement and the close focus arrangement.

In the illustrated embodiment, the first spherical lens element 116 has negative refractive power, and the first spherical lens element 116 moves away from the first cylindrical lens element 112 and toward the second cylindrical lens element 114 as the anamorphic lens assembly 100 transitions away from the infinity focus arrangement and toward the close focus arrangement. In alternative embodiments, the first spherical lens element 116 may have positive refractive power, and in such embodiments the first spherical lens element 116 would move away from the second cylindrical lens element 114 and toward the second first cylindrical lens element 112 as the anamorphic lens assembly 100 transitions away from the infinity focus arrangement toward the close focus arrangement.

FIGS. 4A-4D illustrate a general treatment of the anamorphic lens assembly 100 of FIGS. 1A and 1B using paraxial optics. In FIGS. 4A and 4B, the viewpoint is along the y-axis 121, while in FIGS. 4C and 4D the viewpoint is along the x-axis 120. Each of the lens elements/components 104, 112, 114, 116 is illustrated as a thin lens with a focal length $f_x$. The distances between the lens elements/components 104, 112, 114, 116 are represented as $d_x$, where $d_1$ is the distance between the first cylindrical lens element 112 and the first spherical lens element 116, $d_2$ is the distance between the first spherical lens element 116 and the second cylindrical lens element 114, and $d_3$ is the distance between the second cylindrical lens element 114 and the primary lens component 104. The back focal length (BFL) of the anamorphic lens assembly 100 is the distance between the primary lens component 104 and the image plane 106.

In the illustrated embodiment, the first cylindrical lens element 112 has a negative focal length $f_1$ along the x-axis 120, the first spherical lens element 116 has a negative focal length $f_2$, the second cylindrical lens element 114 has a positive focal length $f_3$ along the x-axis 120, and the primary lens component 104 has a positive focal length $f_4$. In some embodiments, the focal lengths of the lens elements/components 104, 112, 114, 116 are selected such that the effective focal length of the anamorphic lens assembly 100 along the x-axis 120 (horizontal) is shorter than the effective focal length along the y-axis (vertical) by the desired anamorphic ratio. In some embodiments, the BFL of the anamorphic lens assembly 100 is identical along both the x-axis 120 and the y-axis (zero astigmatism).

The EFL (effective focal length) of the anamorphic lens assembly 100 along the y-axis can be calculated from the focal lengths of the first spherical lens element 116 ($f_2$) and the primary lens component 104 ($f_4$) and the distance between them $d_2+d_3$. For the y-axis case, the first and second cylindrical lens elements 112, 114 can be ignored, since they have zero power along the y-axis (at least in this example embodiment). The formula for the EFL of the first spherical lens element 116 and the primary lens component 104 along the y-axis (when represented as two thin lenses) is:

$$EFL_y = \frac{1}{f_2} + \frac{1}{f_4} - \frac{d_2+d_3}{f_2 \times f_4},$$

where $d_2+d_3$ represents the total distance between the first spherical lens element 116 and the primary lens component 104.

Calculation of the EFL of the anamorphic lens assembly 100 along the x-axis 120 (which includes the cylindrical powers of the first and second cylindrical lens elements 112, 114) is more complex, but can be represented using ABCD matrix techniques. For the anamorphic lens assembly 100, which includes four lens elements/components 104, 112, 114, 116, the Gaussian transfer matrix is represented by the following product:

$$\begin{pmatrix} A & B \\ C & D \end{pmatrix} = \begin{pmatrix} 1 & 0 \\ \frac{-1}{f_4} & 1 \end{pmatrix} \times \begin{pmatrix} 1 & d_3 \\ 0 & 1 \end{pmatrix} \times$$

$$\begin{pmatrix} 1 & 0 \\ \frac{-1}{f_3} & 1 \end{pmatrix} \times \begin{pmatrix} 1 & d_2 \\ 0 & 1 \end{pmatrix} \times \begin{pmatrix} 1 & 0 \\ \frac{-1}{f_2} & 1 \end{pmatrix} \times \begin{pmatrix} 1 & d_1 \\ 0 & 1 \end{pmatrix} \times \begin{pmatrix} 1 & 0 \\ \frac{-1}{f_1} & 1 \end{pmatrix}$$

The resultant ABCD transfer matrix can be used to determine the EFL of the anamorphic lens assembly 100 along the x-axis 120, which is represented by the C term (lower left) of the matrix. The formula for the EFL of the anamorphic lens assembly 100 alone the x-axis 120 is:

$$\frac{-1}{EFL_x} = \frac{-1}{f_4} - \frac{1}{f_3}\left(1 - \frac{d_3}{f_3}\right) - \frac{1}{f_2}\left(d_2\left(\frac{-1}{f_3}\left(1 - \frac{d_3}{f_4}\right) - \frac{1}{f_4}\right) + 1 - \frac{d_3}{f_4}\right) -$$

$$\frac{1}{f_1}\left(d_1\left(\frac{-1}{f_3}\left(1 - \frac{d_3}{f_4}\right) - \frac{1}{f_4} - \frac{1}{f_2}\left(d_2\left(\frac{-1}{f_4} - \frac{1}{f_3}\left(1 - \frac{d_3}{f_4}\right)\right) + 1 - \frac{d_3}{f_4}\right)\right) +$$

$$d_2\left(\frac{-1}{f_3}\left(1 - \frac{d_3}{f_4}\right) - \frac{1}{f_4}\right) + 1 - \frac{d_3}{f_4}\right)$$

Solutions to the above paraxial problem can also be found using damped least-squares optimization with the constraints of having the horizontal and vertical EFLs differ by the anamorphic ratio, while also forcing the BFL to be identical in both axes over a range of focus positions.

An example solution to the paraxial problem is shown below. Referring to the infinity focus arrangement of FIGS. 4A and 4C, the following values are assigned:

$f_1$=−100 mm cylindrical (x-axis)
$f_2$=−240 mm spherical
$f_3$=200 mm cylindrical (x-axis)
$f_4$=50 mm spherical
$d_1$=18 mm
$d_2$=37 mm
$d_3$=12.7 mm The foregoing paraxial combination results in a 50 mm EFL along the y-axis and a 33.4 mm EFL along the x-axis 120, with a paraxial BFL of 60.4 mm. In this example, the anamorphic ratio at the infinity focus arrangement is 1.5×. When the object 126 moves closer to the anamorphic lens assembly 100 (e.g., to a distance of 500 mm; the distances between the object 126 and the anamorphic lens assembly 100 are not drawn to scale in FIGS. 4A-4D), the relative positions of the four lens elements/components 104, 112, 114, 116 are adjusted (e.g., by rotating the focus ring 124) to form a focused image at the image plane 106. In this configuration, and referring to the close focus arrangement of FIGS. 4B and 4D:

$d_1$=43.51 mm
$d_2$=11.49 mm
$d_3$=4.55 mm

Note that the sum of $d_1$ and $d_2$ remains constant as the anamorphic lens assembly 100 is focused, because the distance between the first and second cylindrical lens elements 112, 114 is fixed. In this paraxial representation, the anamorphic ratio changes slightly (e.g., to 1.468×), and the EFLs along the y-axis and the x-axis, respectively, change to 58.2 mm and 39.7 mm while the paraxial BFL increases to 67.48 mm in the close focus arrangement of FIGS. 4B and 4D. Because the astigmatism is corrected by the combination of the three lens elements 112, 114, 116, refocusing by adjusting the primary lens component 104 (moving $f_4$ relative to $f_3$), or by moving the image plane 106, has no impact on image quality.

It should be noted that not all solutions to the above paraxial system are practical, as it is possible to have solutions where one or more of the distances $d_1$, $d_2$, or $d_3$ are negative. Practical solutions may also require that the anamorphic ratio change slightly between the infinity focus arrangement and the close focus arrangement, but in practice it is possible to limit this change in anamorphic ratio to less than a few percent.

TABLE 1 below presents an optical prescription of one example embodiment of the anamorphic lens assembly 100 shown in FIGS. 1A and 1B.

TABLE 1

| Surface | Radius | Radius | Thickness | Nd | Vd |
| --- | --- | --- | --- | --- | --- |
| OBJ | STANDARD | Infinity | 600 | 1176.083 | 0 |
| 1 | TOROIDAL | −130.1000 | 5.0000 | 1.712995 | 53.8671 |
| 2 | TOROIDAL | 97.9500 | 31.5950 | | |
| 3 | STANDARD | −513.0000 | 3.0000 | 1.703000 | 52.3794 |
| 4 | STANDARD | 513.0000 | 2.9000 | | |
| 5 | TOROIDAL | 195.6000 | 6.0000 | 1.516330 | 64.0651 |
| 6 | TOROIDAL | −107.7000 | 1.3240 | | |

TABLE 1-continued

| Surface | Radius | Radius | Thickness | Nd | Vd |
|---|---|---|---|---|---|
| 7 | STANDARD | 71.5300 | 4.5000 | 1.712995 | 53.8671 |
| 8 | STANDARD | −1030.0000 | 0.3000 | | |
| 9 | STANDARD | 25.1500 | 7.0457 | 1.729157 | 54.6800 |
| 10 | STANDARD | 28.4500 | 0.3000 | | |
| 11 | STANDARD | 18.8700 | 4.0000 | 1.788800 | 28.4287 |
| 12 | STANDARD | 12.5700 | 10.5820 | | |
| STO | STANDARD | Infinity | 5.2520 | | |
| 14 | STANDARD | −12.5200 | 1.4828 | 1.788800 | 28.4287 |
| 15 | STANDARD | −33.0800 | 4.8394 | 1.772499 | 49.5984 |
| 16 | STANDARD | −16.8500 | 0.3000 | | |
| 17 | STANDARD | −302.1000 | 6.0047 | 1.740999 | 52.6365 |
| 18 | STANDARD | −26.9000 | 0.3000 | | |
| 19 | STANDARD | 51.1000 | 9.3853 | 1.589130 | 61.1350 |
| 20 | STANDARD | −33.5205 | 1.5000 | 1.953749 | 32.3247 |
| 21 | STANDARD | −2960.0000 | 29.9760 | | |
| IMA | STANDARD | Infinity | 47.6504 | 0.0000 | |
| THIC 0 | INFINITY | 600 | | | |
| THIC 2 | 8.3000 | 31.5950 | | | |
| THIC 4 | 26.2000 | 2.9000 | | | |
| THIC 6 | 4.8000 | 1.3240 | | | |
| THIC 21 | 26.5000 | 29.9760 | | | |

In some embodiments, the following paraxial solution process may be used to narrow down the range of possible configurations for the anamorphic lens assembly. The paraxial solution process defines the following ten variables:

The focal lengths of the lenses: $f_1, f_2, f_3, f_4$;

The distances between the lenses at the infinity focus arrangement: $d_{1inf}, d_{2inf}, d_{3inf}$; and The distances between the lenses at the close focus arrangement: $d_{1close}, d_{2close}, d_{3close}$.

Using these ten variables, and based on known and/or desired properties of the resulting anamorphic lens assembly, the paraxial solution process defines the following six equations:

$$d_{1inf} + d_{2inf} = d_{1close} + d_{2close} \text{ (due to the fixed spacing of the cylindrical lens elements } f_1, f_3) \quad (1)$$

(2)

$$\frac{EFL_{xinf}}{EFL_{yinf}} = \text{the desired value of}$$

the anamorphic ratio at the infinity focus arrangement (3)

$$\frac{EFL_{xclose}}{EFL_{yclose}} = \text{the anamorphic ratio at the close focus arrangement}$$

$EFL_{xinf}$=a constant (the desired value of EFL at the infinity focus arrangement) (4)

$BFL_{xinf}=BFL_{yinf}$ (due to the zero astigmatism at the infinity focus arrangement) (5)

$BFL_{xclose}=BFL_{yclose}$ (due to the zero astigmatism at the close focus arrangement) (6)

With six equations in ten variables, there are infinite sets of solutions. However, setting two or three of the variables as constants reduces the scope of the solution sets sufficiently to enable solutions to be found using, for example, iterative techniques.

In some embodiments, equations (2) and (3) above will be equal to one another, because the anamorphic ratio will be the same at both the infinity focus arrangement and the close focus arrangement. As discussed above, however, in some embodiments of the present anamorphic lens assemblies the anamorphic ratio may vary slightly between the infinity focus arrangement and the close focus arrangement. For example, the anamorphic ratio may vary by less than 2% between the infinity focus arrangement and the close focus arrangement. In embodiments in which the anamorphic ratio at the infinity focus arrangement is not equal to the anamorphic ratio at the close focus arrangement, equations (2) and (3) above will not be equal to one another. In such embodiments, the lens design process may advantageously attempt to match the anamorphic ratio change of legacy, or classic, anamorphic lenses. In classic anamorphic lenses, the anamorphic ratio is typically smaller at close focus than at infinity focus. There are paraxial solutions that have no change in the anamorphic ratio between close focus and infinity focus, but in practice this condition may not be achievable due to interactions among the principal planes of the various groups of lenses.

As discussed above, in some embodiments one or more of the lens elements may comprise multiple lenses, such as doublets. FIGS. 5A and 5B illustrate one such example embodiment. The anamorphic lens assembly 500 of FIGS. 5A and 5B includes a first cylindrical lens element 502 and a second cylindrical lens element 504 that each comprise doublets. The doublet of the first cylindrical lens element 502 comprises two negative cylinders, while the doublet of the second cylindrical lens element 504 comprises two cylinders that together have positive power and reduce color aberrations. In some embodiments, the doublet of the second cylindrical lens element 504 may comprise two positive cylinders. The first spherical lens element 506 has negative refractive power, such that the first spherical lens element 506 moves toward the primary lens component 508 as the anamorphic lens assembly 500 transitions away from the infinity focus arrangement of FIG. 5A and toward the close focus arrangement of FIG. 5B. In the illustrated embodiment, the anamorphic ratio of the anamorphic lens assembly 500 may comprise, for example, a 1.8× squeeze (or any other squeeze).

As discussed above, in some embodiments the first spherical lens element may have positive refractive power. FIGS. 6A and 6B illustrate one such example embodiment. The anamorphic lens assembly 600 of FIGS. 6A and 6B includes a first spherical lens element 602 comprising a doublet with positive refractive power. The first spherical lens element 602 moves toward the primary lens component 604 as the anamorphic lens assembly 600 transitions away from the infinity focus arrangement of FIG. 6A and toward the close focus arrangement of FIG. 6B.

Figure 7A:
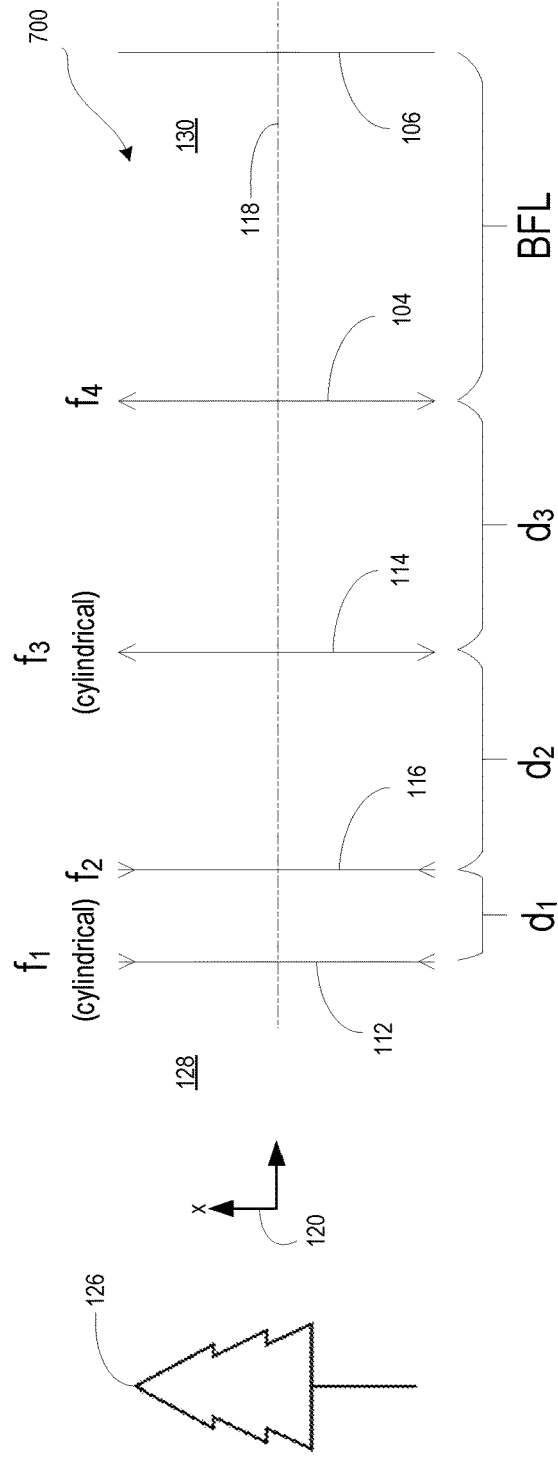
FIGS. 7A and 7B are schematic diagrams illustrating another anamorphic lens assembly according to some embodiments.
Figure 7B:
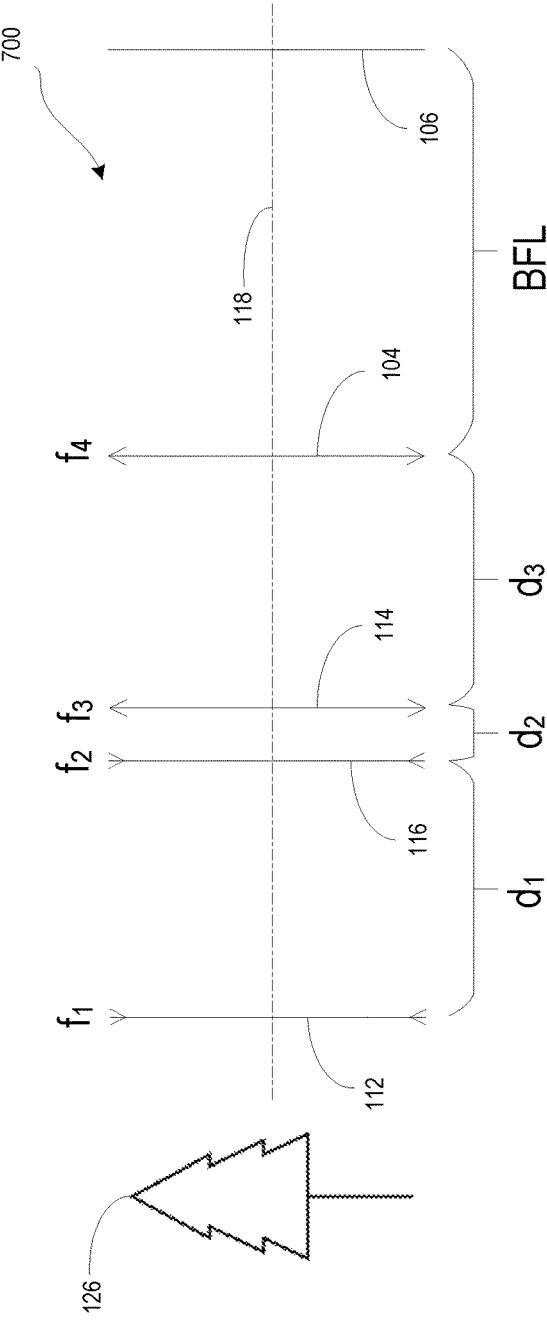

In the paraxial representation of some embodiments, the distance $d_3$ may not change as the focus of the anamorphic lens assembly is adjusted. Instead, the BFL (the distance between $f_4$ and the image plane 106) may change. FIGS. 7A and 7B illustrate an example embodiment of one such anamorphic lens assembly 700. FIG. 7A illustrates the anamorphic lens assembly 700 in the infinity focus arrangement, and FIG. 7B illustrates the anamorphic lens assembly 700 in the close focus arrangement. As the anamorphic lens assembly 700 transitions from the infinity focus arrangement (FIG. 7A) to the close focus arrangement (FIG. 7B), $d_1$ increases while $d_2$ decreases such that the sum of $d_1$ and $d_2$ remains constant. $d_3$ remains constant while the BFL of the anamorphic lens assembly 700 increases. In alternative embodiments, the relative changes in $d_1$, $d_2$, $d_3$, and BFL may vary, particularly as the focal lengths of the various lenses are varied. For example, if the first spherical lens element 116 in the example shown in FIGS. 7A and 7B has a negative focal length $f_2$, then in an alternative embodiment in which the first spherical lens element 116 has a positive focal length $f_2$, as the anamorphic lens assembly transitions from the infinity focus arrangement to the close focus arrangement $d_1$ may decrease while $d_2$ increases, $d_3$ remains constant, and the BFL of the anamorphic lens assembly decreases. Further, paraxial solutions exist for embodiments in which $d_3$ changes and the BFL remains constant, and the focusing mechanism of the primary lens component 104 doesn't necessarily require moving the primary lens component 104 away from the image plane 106. For example, these conditions may be satisfied in embodiments in which the primary lens component 104 includes an internal focus mechanism in which internal lens elements of the primary lens component 104 are movable, but the primary lens component 104 as a whole does not move relative to the anamorphic lens component 102.

FIGS. 8A and 8B illustrate another anamorphic lens assembly 800 according to some embodiments. Similar to the embodiment of FIGS. 1A and 1B, the anamorphic lens assembly 800 includes an anamorphic lens component 802, a primary lens component 804, a first cylindrical lens element 812, a second cylindrical lens element 814, and a first spherical lens element 816 disposed between the first and second cylindrical lens elements 812, 814. Relative positions of the first and second cylindrical lens elements 812, 814 are fixed along an optical axis 818 of the anamorphic lens assembly 800, while the first spherical lens element 816 is translatable along the optical axis 818 with respect to the first and second cylindrical lens elements 812, 814. TABLE 2 below presents an optical prescription of the example embodiment of the anamorphic lens assembly 800 shown in FIGS. 8A and 8B.

TABLE 2

| Surface | Radius | Thickness | Nd | Vd |
|---|---|---|---|---|
| OBJ | Infinity | Infinity | | |
| 1 | −183.8333 | 5.0000 | 1.729157 | 54.68001 |
| 2 | 95.0298 | 7.0000 | | |
| 3 | 200.0000 | 3.0000 | 1.516330 | 64.06513 |
| 4 | 91.6639 | 33.5000 | | |
| 5 | 201.1614 | 6.0000 | 1.528410 | 76.45282 |
| 6 | −139.0105 | 5.1260 | | |
| 7 | 173.0229 | 2.5000 | 1.712995 | 53.86706 |
| 8 | −291.4164 | 0.3000 | | |
| 9 | 34.8983 | 8.1731 | 1.804000 | 46.52753 |
| 10 | −44.5651 | 2.3587 | 1.720467 | 34.70798 |
| 11 | 42.4306 | 6.0000 | | |
| STO | Infinity | 5.6507 | | |
| 13 | −18.6601 | 1.3000 | 1.720002 | 46.02457 |
| 14 | −163.3591 | 2.0000 | | |
| 15 | −30.2437 | 6.8506 | 1.793600 | 37.08945 |
| 16 | −21.5280 | 0.3000 | | |
| 17 | 99.9762 | 4.0000 | 1.743198 | 49.33944 |
| 18 | −75.9795 | 0.3000 | | |
| 19 | 77.6224 | 5.7235 | 1.804000 | 46.52753 |
| 20 | −46.2051 | 2.1386 | | |
| 21 | −37.1102 | 1.5000 | 1.959060 | 17.47125 |
| 22 | −600.5993 | 28.3924 | | |
| IMA | Infinity | | | |
| THIC 0 | | Infinity | 600.0000 | |
| THIC 2 | | 7.0000 | 31.2100 | |
| THIC 4 | | 33.5000 | 9.2900 | |
| THIC 6 | | 5.1260 | 1.4000 | |
| THIC 22 | | 28.3924 | 32.1180 | |

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

References to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean any of A, B, or C, or any combination thereof (e.g., A, B, and/or C). Similarly, language such as "at least one or more of A, B, and C" (or "one or more of A, B, and C") is intended to be understood to mean any of A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. This term does not foreclose additional factors that may affect a determination or action. For example, a determination may be solely based on the factor(s) listed or based on the factor(s) and one or more additional factors. Thus, if an action A is "based on"

B, then B is one factor that affects action A, but this does not foreclose the action A from also being based on one or more other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (meaning having the potential to), rather than the mandatory sense (meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. An anamorphic lens assembly for a camera, the anamorphic lens assembly comprising:
   an anamorphic lens component; and
   a primary lens component;
   the anamorphic lens component comprising:
      a negative power first cylindrical lens element having a first radius of curvature along a first axis;
      a positive power second cylindrical lens element having a second radius of curvature along the first axis, relative positions of the first and second cylindrical lens elements being fixed along an optical axis of the anamorphic lens assembly; and
      a first spherical lens element disposed between the first and second cylindrical lens elements and translatable along the optical axis with respect to the first and second cylindrical lens elements, wherein the first spherical lens element is movable along the optical axis with respect to the primary lens component;
   the primary lens component comprising:
      one or more second spherical lens elements disposed on a side of the second cylindrical lens element opposite the first spherical lens element;
   an order of the lens elements comprising, from an object side toward an image side: the first cylindrical lens element, the first spherical lens element, the second cylindrical lens element, and the one or more second spherical lens elements;
   optical characteristics of the first cylindrical lens element, the first spherical lens element, and the second cylindrical lens element in combination producing zero astigmatism in an image plane for an object at infinity focus; and
   the optical characteristics of the first cylindrical lens element, the first spherical lens element, and the second cylindrical lens element in combination being adjustable by the first spherical lens element translating along the optical axis with respect to the first and second cylindrical lens elements, such that the first cylindrical lens element, the first spherical lens element, and the second cylindrical lens element in combination produce a first astigmatism that is opposite to a second astigmatism produced in the image plane by the one or more second spherical lens elements as the object moves from the infinity focus toward the anamorphic lens assembly.

2. The anamorphic lens assembly for a camera of claim 1, the primary lens component further comprising a focus ring, wherein relative movements of the focus ring and the first spherical lens element are defined by a polynomial relationship having a degree of two.

3. An anamorphic lens assembly comprising:
   a first cylindrical lens element;
   a second cylindrical lens element; and
   a first spherical lens element disposed between the first and second cylindrical lens elements and moveable along an optical axis of the anamorphic lens assembly with respect to the first and second cylindrical lens elements;
   the optical characteristics of the first cylindrical lens element, the first spherical lens element, and the second cylindrical lens element in combination being adjustable as the first spherical lens element moves with respect to the first and second cylindrical lens elements such that the first cylindrical lens element, the first spherical lens element, and the second cylindrical lens element in combination produce a first astigmatism that is opposite to a second astigmatism produced in an image plane by one or more second spherical lens elements as an object moves from infinity focus toward the anamorphic lens assembly, wherein the first spherical lens element is movable along the optical axis with respect to the one or more second spherical lens elements.

4. The anamorphic lens assembly of claim 3, wherein the one or more second spherical lens elements comprise a primary lens component including a focus adjustment member disposed around the primary lens component.

5. The anamorphic lens assembly of claim 4, wherein the focus adjustment member, the primary lens component, and the first spherical lens element are mechanically coupled such that as the focus adjustment member is rotated in a first rotational direction around the primary lens component the primary lens component is adjusted away from an infinity focus arrangement and toward a close focus arrangement while the first spherical lens element travels along the optical axis in one of:
   a first direction toward the second cylindrical lens element and away from the first cylindrical lens element; or
   a second direction away from the second cylindrical lens element and toward the first cylindrical lens element.

6. The anamorphic lens assembly of claim 3, the primary lens component further comprising a focus adjustment member, wherein relative movements of the focus adjustment member and the first spherical lens element are defined by a polynomial relationship having a degree of two.

7. The anamorphic lens assembly of claim 3, wherein as the first spherical lens element travels along the optical axis relative to the first and second cylindrical lens elements, a spacing between the second cylindrical lens element and the primary lens component changes.

8. The anamorphic lens assembly of claim 3, wherein optical characteristics of the first cylindrical lens element, the first spherical lens element, and the second cylindrical lens element in combination produce zero astigmatism in the image plane for the object at infinity focus.

9. The anamorphic lens assembly of claim 3, wherein as the anamorphic lens assembly transitions between an infinity focus arrangement and a close focus arrangement, horizontal and vertical focal lengths of a combination of the first cylindrical lens element, the first spherical lens element, and the second cylindrical lens element change due to changes in a first spacing between the first cylindrical lens element and the first spherical lens element and a second spacing between the second cylindrical lens element and the first spherical lens element.

10. The anamorphic lens assembly of claim 9, wherein changes to the focal lengths cause an anamorphic ratio of the anamorphic lens assembly to also change.

11. The anamorphic lens assembly of claim 10, wherein a difference in the anamorphic ratio is less than 2% between the infinity focus arrangement and the close focus arrangement.

12. A camera system comprising:
an image plane;
an anamorphic lens component; and
a primary lens component;
the anamorphic lens component comprising:
    a first cylindrical lens element;
    a second cylindrical lens element; and
    a first spherical lens element disposed between the first and second cylindrical lens elements and movable along an optical axis of the anamorphic lens component with respect to the first and second cylindrical lens elements, wherein the first spherical lens element is movable along the optical axis with respect to the primary lens component;
the primary lens component comprising:
    one or more second spherical lens elements disposed on a side of the second cylindrical lens element opposite the first spherical lens element;
the optical characteristics of the first cylindrical lens element, the first spherical lens element, and the second cylindrical lens element in combination being adjustable as the first spherical lens element moves with respect to the first and second cylindrical lens elements such that the first cylindrical lens element, the first spherical lens element, and the second cylindrical lens element in combination produce a first astigmatism that is opposite to a second astigmatism produced in the image plane by the one or more second spherical lens elements as an object moves from infinity focus toward the camera system.

13. The camera system of claim 12, further comprising a focus adjustment member disposed around the primary lens component.

14. The camera system of claim 13, wherein the focus adjustment member, the primary lens component, and the first spherical lens element are mechanically coupled such that as the focus adjustment member is rotated in a first rotational direction around the primary lens component the primary lens component is adjusted away from an infinity focus arrangement and toward a close focus arrangement while the first spherical lens element travels along the optical axis in one of:
    a first direction toward the second cylindrical lens element and away from the first cylindrical lens element; or
    a second direction away from the second cylindrical lens element and toward the first cylindrical lens element.

15. The camera system of claim 12, the primary lens component further comprising a focus adjustment member, wherein relative movements of the focus adjustment member and the first spherical lens element are defined by a polynomial relationship having a degree of two.

16. The camera system of claim 12, wherein as the first spherical lens element travels along the optical axis relative to the first and second cylindrical lens elements, a spacing between the second cylindrical lens element and the primary lens component changes.

17. The camera system of claim 12, wherein optical characteristics of the first cylindrical lens element, the first spherical lens element, and the second cylindrical lens element in combination produce zero astigmatism in the image plane for the object at infinity focus.

18. The camera system of claim 12, wherein as the anamorphic lens component and the primary lens component transition between an infinity focus arrangement and a close focus arrangement, horizontal and vertical focal lengths of a combination of the first cylindrical lens element, the first spherical lens element, and the second cylindrical lens element change due to changes in a first spacing between the first cylindrical lens element and the first spherical lens element and a second spacing between the second cylindrical lens element and the first spherical lens element.

19. The camera system of claim 18, wherein changes to the focal lengths cause an anamorphic ratio of the camera system to also change.

20. The camera system of claim 19, wherein a difference in the anamorphic ratio is less than 2% between the infinity focus arrangement and the close focus arrangement.

* * * * *